(12) United States Patent
Myers et al.

(10) Patent No.: US 11,881,676 B2
(45) Date of Patent: Jan. 23, 2024

(54) END-PUMPED Q-SWITCHED LASER

(71) Applicant: L3Harris Technologies, Inc., Melbourne, FL (US)

(72) Inventors: Jeffrey A. Myers, Melbourne, FL (US); Baoping Guo, Melbourne, FL (US); Edward Miesak, Melbourne, FL (US)

(73) Assignee: L3Harris Technologies, Inc., Melbourne, FL (US)

( * ) Notice: Subject to any disclaimer, the term of this patent is extended or adjusted under 35 U.S.C. 154(b) by 0 days.

(21) Appl. No.: 16/778,454

(22) Filed: Jan. 31, 2020

(65) Prior Publication Data

US 2020/0251874 A1 Aug. 6, 2020

Related U.S. Application Data

(60) Provisional application No. 62/799,469, filed on Jan. 31, 2019.

(51) Int. Cl.
| | |
|---|---|
| *H01S 3/0941* | (2006.01) |
| *H01S 3/04* | (2006.01) |
| *H01S 3/042* | (2006.01) |
| *H01S 3/1115* | (2023.01) |
| *H01S 3/06* | (2006.01) |

(Continued)

(52) U.S. Cl.
CPC ........ *H01S 3/09415* (2013.01); *H01S 3/0401* (2013.01); *H01S 3/042* (2013.01); *H01S 3/0405* (2013.01); *H01S 3/0604* (2013.01); *H01S 3/094053* (2013.01); *H01S 3/1115* (2013.01); *H01S 3/1608* (2013.01); *G01S 7/4814* (2013.01); *H01S 3/061* (2013.01); *H01S 3/0606* (2013.01); *H01S 3/094084* (2013.01); *H01S 3/113* (2013.01); *H01S 3/1618* (2013.01);

(Continued)

(58) Field of Classification Search
CPC .... H01S 3/09415; H01S 3/0405; H01S 3/042; H01S 3/0401; H01S 3/113; H01S 3/0625; H01S 3/0619–0623; H01S 3/0627; H01S 3/08059; H01S 3/1115; H01S 3/09403; H01S 3/0606; H01S 3/1608; H01S 3/1618; H01S 3/17–177; H01S 3/0602–0615

See application file for complete search history.

(56) References Cited

U.S. PATENT DOCUMENTS

| | | | |
|---|---|---|---|
| 4,327,129 A * | 4/1982 | Sepp | H01S 3/08081 427/164 |
| 4,731,795 A * | 3/1988 | Clark | H01S 3/0933 372/107 |

(Continued)

FOREIGN PATENT DOCUMENTS

| | | | | |
|---|---|---|---|---|
| CA | 1289395 C | * | 9/1991 | ......... G02B 19/0076 |
| CN | 1313069 A | * | 9/2001 | |

(Continued)

*Primary Examiner* — Joshua King
(74) *Attorney, Agent, or Firm* — Condo Roccia Koptiw LLP

(57) ABSTRACT

A laser system may include one or more of the following components: a power supply, a continuous wave pump laser, a fiber optic cable, a positive lens, a gain medium, a heat sink, and/or a Q-switch. The laser system may be used in a light detection and ranging (LIDAR) system such as a scanning LIDAR system. The laser system may be designed to operate at wavelengths that may be safe for human eyes.

11 Claims, 8 Drawing Sheets

(51) Int. Cl.
  *H01S 3/094* (2006.01)
  *H01S 3/16* (2006.01)
  *G01S 7/481* (2006.01)
  *H01S 3/17* (2006.01)
  *H01S 3/113* (2006.01)

(52) U.S. Cl.
  CPC ........... *H01S 3/1685* (2013.01); *H01S 3/1698* (2013.01); *H01S 3/17* (2013.01); *H01S 3/178* (2013.01)

(56) References Cited

U.S. PATENT DOCUMENTS

| | | | | |
|---|---|---|---|---|
| 4,761,786 A * | 8/1988 | Baer | | H01S 3/025 372/10 |
| 4,872,177 A * | 10/1989 | Baer | | H01S 3/08 372/75 |
| 5,062,117 A * | 10/1991 | Anthon | | H01S 3/09415 372/75 |
| 5,260,963 A * | 11/1993 | Baird | | H01S 3/09415 372/95 |
| 5,267,252 A * | 11/1993 | Amano | | H01S 3/042 372/71 |
| 5,303,250 A * | 4/1994 | Masuda | | H01S 3/02 359/328 |
| 5,307,430 A * | 4/1994 | Beach | | G02B 6/4206 359/581 |
| 5,317,447 A * | 5/1994 | Baird | | G02F 1/377 359/328 |
| 5,530,711 A * | 6/1996 | Scheps | | H01S 3/094034 372/20 |
| 5,559,823 A * | 9/1996 | Valette | | H01S 3/101 372/101 |
| 5,577,060 A * | 11/1996 | Nighan, Jr. | | H01S 3/09415 372/106 |
| 5,652,756 A * | 7/1997 | Stultz | | H01S 3/067 372/10 |
| H1673 H * | 8/1997 | Hanson | | 372/34 |
| 5,689,522 A * | 11/1997 | Beach | | H01S 3/09415 372/41 |
| 5,692,005 A * | 11/1997 | Maag | | H01S 3/0621 372/101 |
| 5,703,900 A * | 12/1997 | Nozaki | | H01S 3/025 372/99 |
| 5,732,100 A * | 3/1998 | Thony | | H01S 3/0627 372/108 |
| 5,781,573 A * | 7/1998 | Basu | | H01S 3/042 372/101 |
| 5,982,789 A * | 11/1999 | Marshall | | G02F 1/39 372/22 |
| 6,049,558 A * | 4/2000 | Harada | | H01S 3/09415 372/103 |
| 6,101,201 A * | 8/2000 | Hargis | | H01S 3/0627 372/107 |
| 6,134,258 A * | 10/2000 | Tulloch | | H01S 3/0606 372/36 |
| 6,160,824 A * | 12/2000 | Meissner | | H01S 3/0632 372/10 |
| 6,754,418 B1 * | 6/2004 | Holm | | H01S 3/025 385/49 |
| 6,879,606 B1 * | 4/2005 | Miesak | | H01S 3/109 372/31 |
| 7,193,771 B1 * | 3/2007 | Smith | | H01S 3/042 359/333 |
| 7,769,060 B1 * | 8/2010 | Furuya | | G03B 21/2086 372/21 |
| 7,924,895 B2 * | 4/2011 | McCarthy | | H01S 3/042 372/34 |
| 9,368,933 B1 * | 6/2016 | Nijjar | | H01S 3/113 |
| 9,397,469 B1 * | 7/2016 | Nijjar | | H01S 3/0612 |
| 2002/0075934 A1 * | 6/2002 | Ludewigt | | H01S 3/07 372/70 |
| 2002/0181513 A1 * | 12/2002 | Laurell | | H01S 3/0627 372/11 |
| 2003/0031226 A1 * | 2/2003 | Byren | | H01S 3/09415 372/66 |
| 2003/0063884 A1 * | 4/2003 | Smith | | G02B 6/032 385/129 |
| 2003/0206570 A1 * | 11/2003 | Henrie | | H01S 3/0941 372/99 |
| 2004/0008405 A1 * | 1/2004 | Pelouch | | H01S 3/063 359/341.3 |
| 2005/0058174 A1 * | 3/2005 | Kadoya | | H01S 3/07 372/68 |
| 2005/0063441 A1 * | 3/2005 | Brown | | H01S 3/025 372/50.1 |
| 2005/0152426 A1 * | 7/2005 | Dell'Acqua | | H01S 3/0941 372/69 |
| 2005/0238068 A1 * | 10/2005 | Tang | | H01S 3/09415 372/20 |
| 2005/0259705 A1 * | 11/2005 | Goto | | G02B 6/4249 372/41 |
| 2006/0114961 A1 * | 6/2006 | Manni | | H01S 3/0941 372/70 |
| 2006/0159132 A1 * | 7/2006 | Young | | H01S 3/0627 372/10 |
| 2006/0176913 A1 * | 8/2006 | Souhaite | | H01S 3/113 372/10 |
| 2006/0209912 A1 * | 9/2006 | Luo | | H01S 3/109 372/21 |
| 2007/0071041 A1 * | 3/2007 | Eno | | H01S 3/2383 372/21 |
| 2007/0121689 A1 * | 5/2007 | Brown | | H01S 3/09415 372/39 |
| 2007/0177260 A1 * | 8/2007 | Kuppenheimer | | G02B 27/095 359/399 |
| 2007/0201532 A1 * | 8/2007 | Zhang | | H01S 3/081 372/93 |
| 2007/0253453 A1 * | 11/2007 | Essaian | | H01S 3/109 372/22 |
| 2007/0263686 A1 * | 11/2007 | Kim | | H01S 5/14 372/43.01 |
| 2008/0291948 A1 * | 11/2008 | McCarthy | | H01S 3/042 372/10 |
| 2008/0298407 A1 * | 12/2008 | Ikesue | | C30B 29/28 372/41 |
| 2010/0000486 A1 * | 1/2010 | Herden | | F02P 23/04 123/143 B |
| 2010/0020832 A1 * | 1/2010 | Hoffman | | H01S 3/109 372/5 |
| 2011/0176574 A1 * | 7/2011 | Ikegawa | | H01S 3/0625 372/99 |
| 2012/0033704 A1 * | 2/2012 | Kopf | | G02B 19/0057 372/72 |
| 2012/0195343 A1 * | 8/2012 | Stultz | | H01S 3/08045 372/70 |
| 2012/0269214 A1 * | 10/2012 | Li | | H01S 3/0627 372/11 |
| 2013/0114627 A1 * | 5/2013 | Filgas | | H01S 3/0627 372/11 |
| 2013/0128257 A1 * | 5/2013 | Stettner | | G01S 7/4818 356/4.01 |
| 2013/0208753 A1 * | 8/2013 | Van Leeuwen | | H01S 5/423 372/72 |
| 2013/0255613 A1 * | 10/2013 | Hartke | | F02P 23/04 123/143 B |
| 2014/0010247 A1 * | 1/2014 | Taira | | H01S 3/1115 372/11 |
| 2014/0086268 A1 * | 3/2014 | Stultz | | H01S 3/0627 372/10 |
| 2014/0209794 A1 * | 7/2014 | Woodruff | | G01N 21/718 250/226 |
| 2014/0269787 A1 * | 9/2014 | Lin | | H01S 3/30 372/3 |
| 2016/0087403 A1 * | 3/2016 | Eno | | H01S 3/09415 372/34 |
| 2016/0294144 A1 * | 10/2016 | Williams | | H01S 3/1666 |
| 2017/0117681 A1 * | 4/2017 | Kopf | | H01S 3/1611 |

(56) References Cited

U.S. PATENT DOCUMENTS

| | | | | |
|---|---|---|---|---|
| 2017/0133815 A1* | 5/2017 | Kopf | ......... | H01S 3/1611 |
| 2018/0323572 A1* | 11/2018 | Mildren | ............ | H01S 3/1305 |
| 2019/0089120 A1* | 3/2019 | Abeeluck | ............ | H01S 3/1631 |
| 2019/0109431 A1* | 4/2019 | Waterbury | ............ | H01S 3/1643 |
| 2020/0044409 A1* | 2/2020 | Yu | ..................... | H01S 3/09415 |

FOREIGN PATENT DOCUMENTS

| | | | | | |
|---|---|---|---|---|---|
| CN | 1564389 | A | * | 1/2005 | |
| CN | 101030690 | A | * | 9/2007 | |
| CN | 201270374 | Y | * | 7/2009 | |
| CN | 101819147 | A | * | 9/2010 | |
| CN | 201623359 | U | * | 11/2010 | |
| CN | 201732977 | U | * | 2/2011 | |
| CN | 102074887 | A | * | 5/2011 | |
| CN | 105470804 | A | * | 4/2016 | |
| CN | 108346967 | A | * | 7/2018 | |
| CN | 208157847 | U | * | 11/2018 | |
| CN | 110364924 | A | * | 10/2019 | |
| DE | 3643648 | A1 | * | 7/1987 | ......... H01S 3/08036 |
| DE | 4311454 | A1 | * | 10/1994 | ............ H01S 3/305 |
| DE | 19521943 | A1 | * | 12/1996 | ............ H01S 3/042 |
| DE | 19738121 | A1 | * | 3/1998 | ......... H01S 3/09415 |
| DE | 10139753 | A1 | * | 3/2003 | ............ H01S 3/0602 |
| DE | 102010045184 | A1 | * | 3/2012 | ......... H01S 3/09415 |
| DE | 102018202848 | A1 | * | 8/2019 | ........... G01S 17/931 |
| EP | 0814545 | A2 | * | 6/1997 | |
| EP | 0814545 | A2 | * | 12/1997 | ............ H01S 3/109 |
| EP | 1708319 | A2 | * | 10/2006 | ............... H01S 3/16 |
| GB | 2310312 | A | * | 8/1997 | ........... H01S 3/0621 |
| JP | H05235455 | A | * | 9/1993 | |
| JP | H06209135 | A | * | 7/1994 | |
| JP | 2004363129 | A | * | 12/2004 | |
| JP | 2006005212 | A | * | 1/2006 | |
| JP | 2007081233 | A | * | 3/2007 | ............. H01S 3/109 |
| JP | 2008522409 | A | * | 6/2008 | |
| KR | 19990025419 | A | * | 4/1999 | |
| KR | 100269185 | B1 | * | 10/2000 | |
| KR | 100458677 | B1 | * | 12/2004 | |
| KR | 100525566 | B1 | * | 11/2005 | |
| KR | 100617181 | B1 | * | 8/2006 | |
| KR | 20120060618 | A | * | 6/2012 | |
| WO | WO-9745901 | A1 | * | 12/1997 | ......... H01S 3/09415 |
| WO | WO-03007438 | A1 | * | 1/2003 | ............. H01S 3/117 |
| WO | WO-2004102251 | A1 | * | 11/2004 | ............... G02B 3/14 |
| WO | WO-2010052308 | A1 | * | 5/2010 | ......... G02B 27/0994 |
| WO | WO-2011027731 | A1 | * | 3/2011 | ......... H01S 3/0623 |
| WO | WO-2011140641 | A1 | * | 11/2011 | ............. H01S 3/025 |
| WO | WO-2014156544 | A1 | * | 10/2014 | ............. H01S 5/423 |
| WO | WO-2017083929 | A1 | * | 5/2017 | ............... H01S 3/30 |
| WO | WO-2018053590 | A1 | * | 3/2018 | ......... H01S 3/08059 |
| WO | WO-2019162004 | A1 | * | 8/2019 | ........... G01S 17/931 |

\* cited by examiner

END-PUMPED Q-SWITCHED LASER

CROSS REFERENCE TO RELATED APPLICATIONS

This application claims priority to U.S. provisional patent application No. 62/799,469, filed Jan. 31, 2019, which is incorporated herein by reference in its entirety.

BACKGROUND

Lasers have many practical applications. For example, a laser may be used as part of a light detection and ranging (LIDAR) system, in which a pulsed laser beam is used to determine the distance to a target object. LIDAR systems may be used in, for example, an autonomous vehicle, to determine the distance between the autonomous vehicle and another vehicle, a pedestrian, and/or the like. LIDAR systems may be used in an indoor and/or outdoor environment and may possess one or more characteristics that may be beneficial for operation in the indoor and/or outdoor environment. For example, a LIDAR system may have a small volume, may be waterproof or water-resistant, may be resistant to breakage, and/or may be lightweight.

SUMMARY

Systems, methods, and instrumentalities are disclosed herein for a continuous wave (CW) end-pumped Q-switched laser. For example, a laser system may include one or more of the following components: a power supply, a continuous wave pump laser, a fiber optic cable, a positive lens, a gain medium, a heat sink, and/or a Q-switch. The pump laser may receive power from the power supply, and may generate a laser beam (e.g., a pump laser beam). The pump laser beam may have one or more characteristics (e.g., wavelength/frequency, phase, direction, etc.). An optical component may be used to homogenize the pump laser beam. For example, a fiber optic cable may be coupled to the pump laser and may receive the pump laser beam from the pump laser. The fiber optic cable may homogenize the pump laser beam.

The fiber optic cable may be coupled to a positive lens. The positive lens may receive the pump laser beam from the fiber optic cable and may focus and/or collimate the pump laser beam. The positive lens may receive the pump laser beam directly from the pump laser (e.g., the fiber optic cable may be absent). The positive lens may be coupled to a gain medium. The gain medium may be a glass doped with erbium and/or ytterbium. The gain medium may receive the focused and/or collimated pump laser beam from the positive lens and may generate a second laser beam. The second laser beam may be an output laser beam. The gain medium may have the shape of, for example, a rectangular prism or a cylindrical rod. The gain medium may have an input surface, an output surface, and at least one external surface. The gain medium may receive the focused and/or collimated pump laser beam from the positive lens via the input surface and may emit the output laser beam via the output surface. The gain medium may receive the pump laser beam from the fiber optic cable. For example, the positive lens may be absent, and the gain medium may receive the pump laser beam directly from the fiber optic cable. The heat sink may be coupled to the at least one external surface. For example, the heat sink may be attached to one or more (e.g. each) of the external surfaces that are not an input surface for the pump laser beam or an output surface for the output laser beam. For example, the heat sink may not be coupled to the input surface and output surface. There may be a thermal conductor between the heat sink and the gain medium. The Q-switch may receive the output laser beam from the gain medium and may transmit and/or reflect the output laser beam. The laser system may be used in a LIDAR system such as a scanning LIDAR system. For example, multiple laser systems may be included in a LIDAR system that may be used by automobiles or other vehicles. The laser system may be designed to operate at wavelengths that may be considered eye safe. For example, the laser system may be designed to operate a wavelengths longer than≈1400 nm. As another example, the laser system may be configured to operate at the 1550 nm wavelength.

As disclosed herein, a laser system may be provided. The laser system may comprise a power supply, a pump laser, a gain medium, a heat sink, and a Q-switch. The pump laser may be a continuous-wave pump laser that may be configured to receive power from the power supply and may be configured to generate a first laser beam. The gain medium may comprise an input surface, an output surface, and at least one external surface. The input surface of the gain medium may be configured to receive the first laser beam from the pump laser. The input surface of the gain medium may comprise a reflective coating. The gain medium may be configured to generate a second laser beam and to emit the second laser beam via the output surface. The heat sink may be coupled to the at least one external surface of the gain medium. The Q-switch may be configured to receive the second laser beam from the gain medium.

As disclosed herein, a laser head may be provided. The laser head may comprise a gain medium, a heat sink, and a Q-switch. The gain medium may comprise an input surface, an output surface, and at least one external surface. The input surface may be configured to receive a first laser beam from a pump laser. The gain medium may be configured to generate a second laser beam and to emit the second laser beam via the output surface. The heat sink may be coupled to the at least one external surface of the gain medium. The Q-switch may be coupled to the output surface and may be configured to receive the second laser beam from the gain medium.

As disclosed herein, a positive lens for use in a laser apparatus may be provided. The positive lens may comprise a convex input surface and an output surface. The convex input surface may be configured to receive a laser beam from a pump laser. The convex input surface may be configured to focus the laser beam. The output surface may be configured to transmit the focused laser beam to a gain medium. The output surface may be convex. The output surface may be planar. The output surface may comprise a reflective optical coating. The output surface may be configured to transmit light received from the input surface and to reflect light received from the gain medium.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

An exemplary laser system may include one or more components. For example, a laser system may include one or more of a source of energy (e.g., a power supply), a pumping mechanism, a gain medium, a heat sink, a Q-switch, and/or an optical resonator (e.g., an optical cavity).

Such a laser system may be designed to operate at wavelengths that may be eye safe, such as 1550 nm (e.g., +/−100 nm). In an example embodiment, to meet LIDAR performance requirements, the laser system may be configured to operate at a pulse repetition rate of 20 kHz or greater, with a pulse width of 30 nsec or less, with a minimum pulse energy of at least 2 µJ. However, since LIDAR systems may be installed in environments with a large amount of environmental stresses (e.g., near the engine of an automobile, etc.), the laser system may be designed to be rugged while still meeting the performance requirements. For example, the laser system may be designed to remain operational across a temperature range, such as a temperature range of less than 0° F. to greater than 100° F. Additionally, the size (e.g. overall size) of the laser system may be constrained, as there may be limited space available for housing the laser system component.

Traditional laser systems are often made of expensive components and can be expensive to construct and/or operate. Further, many traditional laser systems are too large to be useful in the LIDAR and/or automotive context. For the LIDAR applications to be commercially feasible, the laser system may be designed to be rugged, be relatively small, and use relatively low-cost components while still meeting one or more performance requirements. Additionally, although the laser system may operate relative inefficiently (e.g., 10 W power input may result in approximately 400 mW output laser at a desired wavelength), the overall design may meet the ruggedness, size, weight, and cost requirements for a LIDAR application.

Figure 1A:
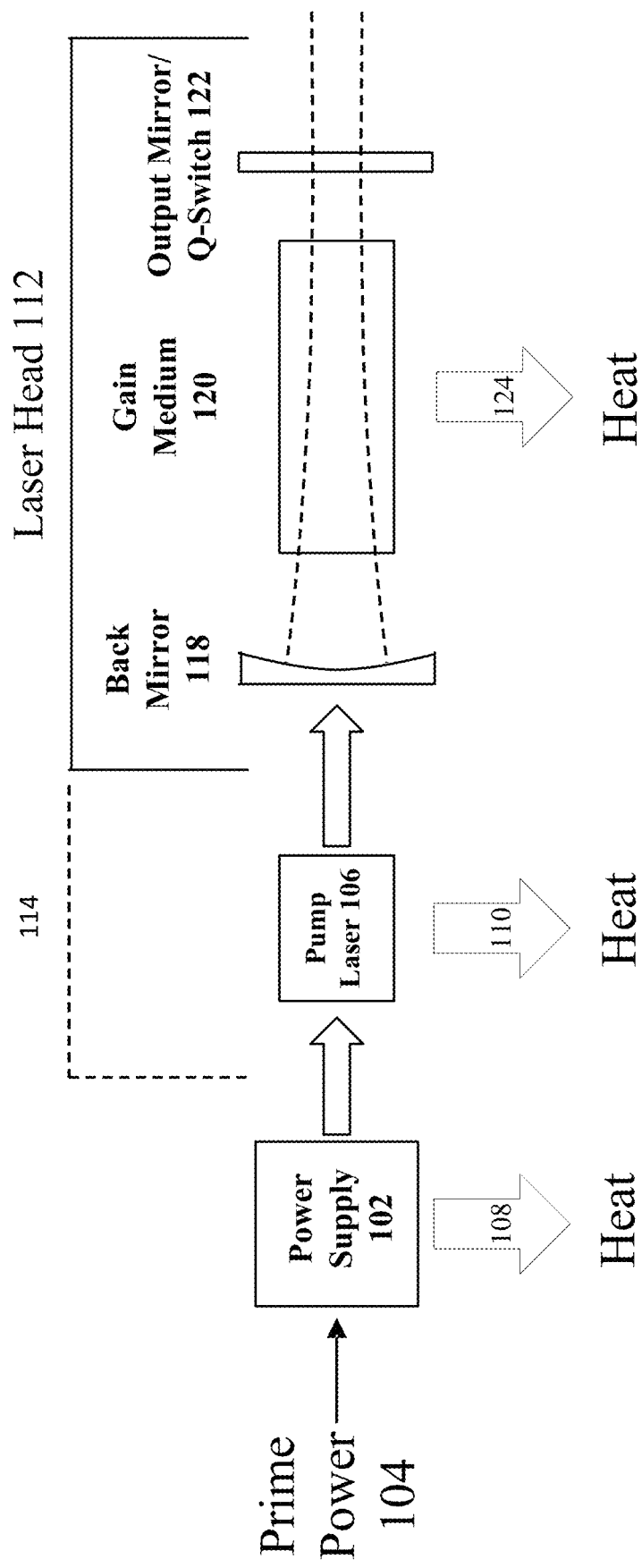
FIG. 1A shows an example laser system.

FIG. 1A shows an example laser system. The laser shown in FIG. 1A may include power supply 102, which may be a laser power supply. Power supply 102 may receive power, such as prime power 104, from a power source. For example, power supply 102 may be plugged into a wall outlet and may receive power from the wall outlet. Power supply 102 may be and/or may be connected to a battery (e.g., a chemical battery). For example, power supply 102 may be a 12V battery. Power supply 102 may be provided by an automobile electrical system or battery. Power supply 102 may provide energy to a pumping mechanism, which may be pump laser 106. Power supply 102 may discharge heat to the environment, such as shown at 108. Power supply 102 may be physically separated from the remainder of the laser system. Physically separating power supply 102 from the remainder of the laser system may result in, for example, improved dissipation of heat generated by power supply 102. For example, physically separating power supply 102 from the remainder of the laser system may result in a lower operating temperature for the laser because power supply 102 may not send heat directly to the laser. Power supply 102 may be connected to pump laser 106 by, for example, an electrical cable.

The laser shown in FIG. 1A may include a pumping mechanism, which may be pump laser 106. Although pump laser 106 is shown with respect to FIG. 1A, pump laser 106 may be replaced with another pumping mechanism such as, for example, a pump laser, an arc lamp, a flash lamp, another optical pumping mechanism, an electric current, an electron beam, and/or the like. The pumping mechanism, such as pump laser 106, may be made from a suitable material. The pumping mechanism (e.g. pump laser 106) may be, for example, a laser diode such as a direct diode laser. The laser diode may be configured to act as a continuous wave (CW) pump laser. As shown in FIG. 1A, the pump laser 106 may receive power from the power supply. Pump laser 106 may be a continuous-wave pump laser. For example, pump laser 106 may continuously receive power and may emit a pump laser beam. Pump laser 106 may be configured to act as a pulsed laser, with a frequency approximately equal to an output of the laser system. If the pump laser is pulsed, the pump pulses and output pulses may be substantially in phase with each other. The pumping mechanism may discharge heat to the environment. For example, pump laser 106 may discharge heat to the environment at 110.

The pump laser 106 may be combined with one or more elements to create a laser head, such as laser head 112. For example, laser head 112 may include pump laser 106, back mirror 118, gain medium 120, and/or an output mirror/Q-switch 122. In an example, pump laser 106 may be outside the laser head. For example, at 114, pump laser 106 may be physically separated from laser head 112. Physically separating pump laser 106 from laser head 112 may result in, for example, improved dissipation of heat generated by pump laser 106. Pump laser 106 may generate a pump laser beam having one or more characteristics, such as a wavelength, phase, intensity, and/or the like. Pump laser 106 may operate at approximately 940 nm with an output power of approximately 12 W or less. The pump laser beam may be directed towards a mirror, such as back mirror 118. Back mirror 118 may be part of an optical cavity. Back mirror 118 may or may not have a positive curve, for example depending on the application and/or pump laser characteristics. The pump laser beam may be redirected, focused, and/or otherwise modified by one or more other mirrors between pump laser 106 and back mirror 118.

There may be a fiber optic cable (not shown) between pump laser 106 and the remainder of the laser system. For example, the fiber optic cable may receive the pump laser beam from pump laser 106. An output laser beam (e.g., emitted by laser head 112) may contain one or more artifacts that may exist in the pump laser beam. Use of a fiber optic cable to connect pump laser 106 to laser head 112 may allow for an improved beam profile (e.g. a high-quality beam profile) to be provided to laser head 112. For example, the improved beam profile may include one or more of maintaining a desired pulse repetition rate, a pulse repetition width, a minimum pulse energy, and maintaining pulse to pulse stability. For example, an optical component, such as a fiber optic cable, may be used to homogenize the pump laser beam such that spatial artifacts present in the pump laser beam are removed. For example, the pump laser beam may be mixed after it has propagated a minimum length (e.g., a few inches) down the fiber optic cable. The fiber optic cable may transmit the homogenized pump laser beam to laser head 112.

There may be one or more other optical elements (not shown) between pump laser 106 and the remainder of the laser system (e.g., back mirror 118, gain medium 120, and/or output mirror/Q-switch 122), between pump laser 106 and the fiber optic cable, and/or between the fiber optic cable and the remainder of the laser system. For example, one or more lenses may be used. A lens (e.g., a rod lens) may be used to collimate the pump laser beam along an axis (e.g., the vertical axis). For example, the rod lens may collimate the pump laser beam along the vertical axis to a diameter of approximately 0.6 mm and/or the approximate height of the gain medium. A second lens (e.g., a second rod lens) may capture the pump laser beam along a second axis (e.g., the horizontal axis), where the pump laser beam may be approximately 1 mm wide. The second rod lens may be used to focus the pump laser beam inside a gain medium, such as gain medium 120. When the pump laser beam is large the intensity may be low and when the pump laser beam is small the intensity may be high. The focusing beam may compensate for absorption in a gain medium, such as gain medium 120.

Figure 1B:
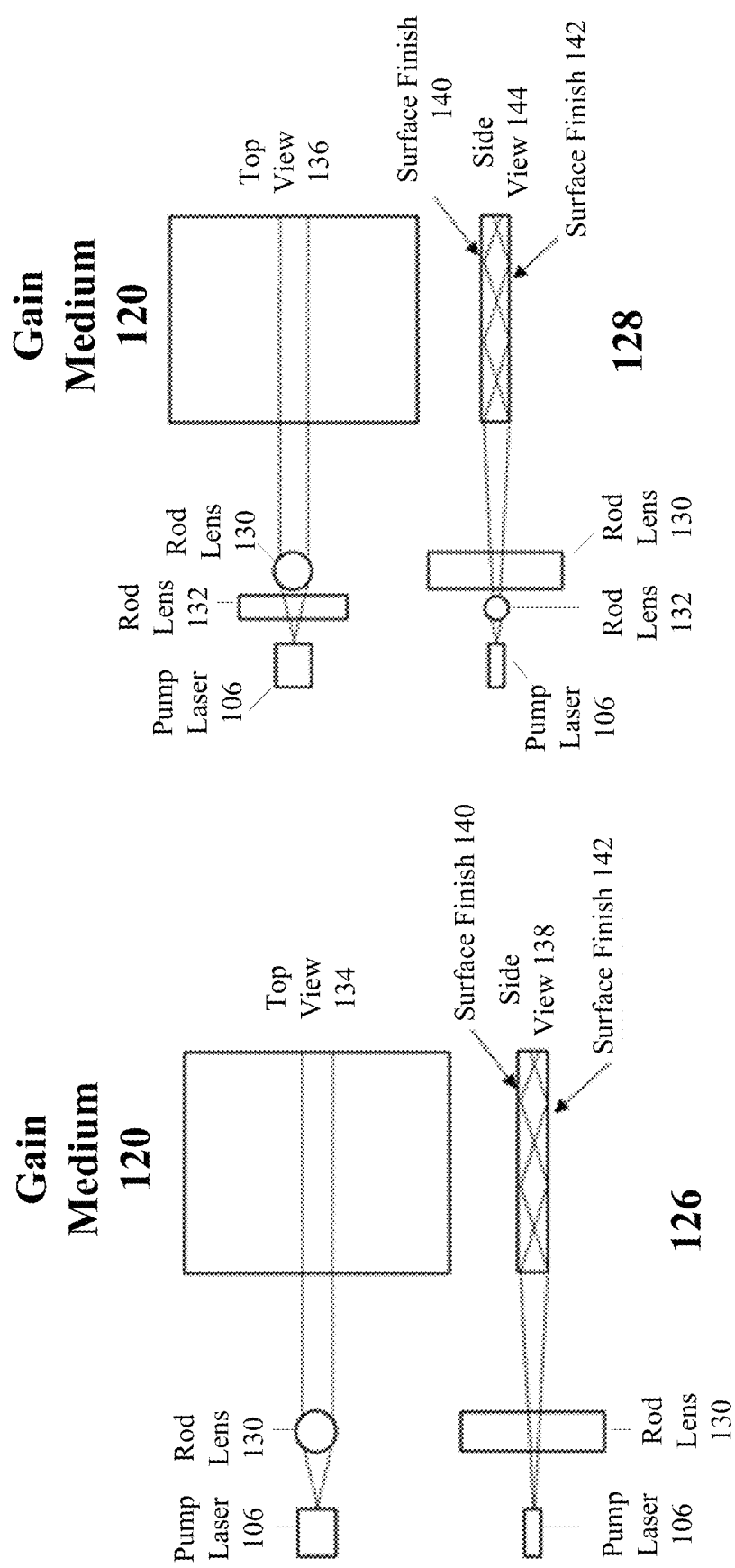
FIG. 1B shows examples of a pump laser beam being altered by one or two rod lenses disposed between a pump laser and a gain medium.

FIG. 1B shows examples of a pump laser beam being altered by one or more rod lenses disposed between a pump laser and a gain medium. For example, there may be one or more (e.g., one or two) rod lenses disposed between pump laser 106 and gain medium 118. FIG. 1B shows examples of a pump laser beam being altered by one (e.g., in the left side of FIG. 1B) or two (e.g., in the right side of FIG. 1B) rod lenses disposed between the pump laser and the gain medium. At 126, pump laser 106 has rod lens 130 disposed between pump laser 106 and gain medium 120. At 128, pump laser 106 has rod lens 130 and rod lens 132 disposed between pump laser 106 and gain medium 120.

The rod lenses, such as rod lens 130 and rod lens 132, may collimate, focus, and/or diverge the pump laser beam. For example, rod lens 130 and/or rod lens 132 may diverge the pump laser beam depending on the alignment of the rod lens 130 and/or rod lens 132 relative to the pump laser 106. The rod lenses may alter the pump laser beam differently in different axes. For example, the rod lenses may collimate the pump laser beam in a first axis and may focus or diverge the pump laser beam in a second axis. For example, the first axis may be a vertical axis and the second axis may be a horizontal axis, or vice versa.

The rod lenses may be purposely aligned to induce a controlled divergence in the pump laser beam in one or more axes, which may result in the pump laser beam interacting in a controlled fashion with inside surfaces of the gain medium, such as gain medium 120. As shown in FIG. 1B, the rod lenses may shape and/or alter the pump laser beam such that the pump laser beam diverges differently along orthogonal axes (e.g., a horizontal axis and a vertical axis). For example, the rod lenses may alter the pump laser beam such that the pump laser beam diverges a relatively small amount in the vertical axis and diverges a relatively large amount in the horizontal axis. The rod lenses may be used regardless of the type or kind of pump laser (e.g., a fiber-coupled pump laser or a single stripe chip laser) being used.

In the less diverging axis, the pump laser beam may propagate along the length of the gain medium, such as gain medium 120, at approximately the same diameter, for example, as shown by the top view 134 and/or top view 136 in FIG. 1B. In the more diverging axis, the pump laser beam may interact with the sides of the gain medium 120, for example, as shown by side view 138 and/or side view 144 in FIG. 1B. Interacting with the sides of gain medium 120 may result in scattering and/or reflecting of the pump laser beam within gain medium 120. The amount of the pump laser beam that is scattered and the amount of the pump laser beam that is reflected may depend on the surface finish of the gain medium, such as surface finish 140 and/or surface finish 142. Scattering and/or reflecting the pump laser beam within gain medium 120 may result in the pump laser beam being homogenized and/or more evenly distributed within gain medium 120, which may result in an improved performance or superior performance for the laser.

The pump laser beam may be generated and/or altered such that the pump laser beam has a constant intensity along the length of the gain medium, such as gain medium 120. For example, a cross sectional area of the pump laser beam may decrease as the pump laser beam penetrates further into the gain medium. The pump laser beam having a varying cross-sectional area within gain medium 120 may compensate for Beer's law absorption of the pump laser beam along the length of gain medium 120. The pump laser beam may be shaped such that the pump laser beam has a relatively constant size along a relatively narrow dimension and converges in a relatively wide dimension. The relatively narrow dimension and the relatively wide dimension may be orthogonal to each other.

For example, gain medium 120 may have the shape of a rectangular prism, with one or more relatively narrow dimensions and one or more relatively wide dimensions. For example, gain medium 120 may have a relatively low height, and a relatively high width and length. The pump laser beam may have a relatively constant size in the height dimension and may converge in the width dimension and/or the length dimension. The pump laser beam may be relatively wide when it enters gain medium 120 and may converge in a controlled manner. The cross-sectional area of the pump laser beam may continuously decrease. Continuously decreasing the cross-sectional area of the pump laser beam may allow for a more constant intensity of the pump laser beam throughout gain medium 120 and may be more effective than using a pump laser beam that is collimated in both the relatively narrow dimension and the relatively wide dimension.

Referring again to FIG. 1A, the laser shown in FIG. 1A may include laser head 112. For example, laser head 112 may include back mirror 118, a gain medium 120, and/or an output mirror/Q-switch 122. Laser head 112 may include pump laser 106, or the laser head may exclude the pump laser 106 as shown at 114, for example, to improve dissipation of heat generated by pump laser 106. Laser head 112 may include a heat sink (not shown). Laser head 112 may receive the pump laser beam from pump laser 106 and may emit an output laser beam via output mirror/Q-switch 122. Gain medium may generate heat, which may be waste heat or excess heat. Gain medium 120 may discharge heat to the environment at 124.

Figure 2:
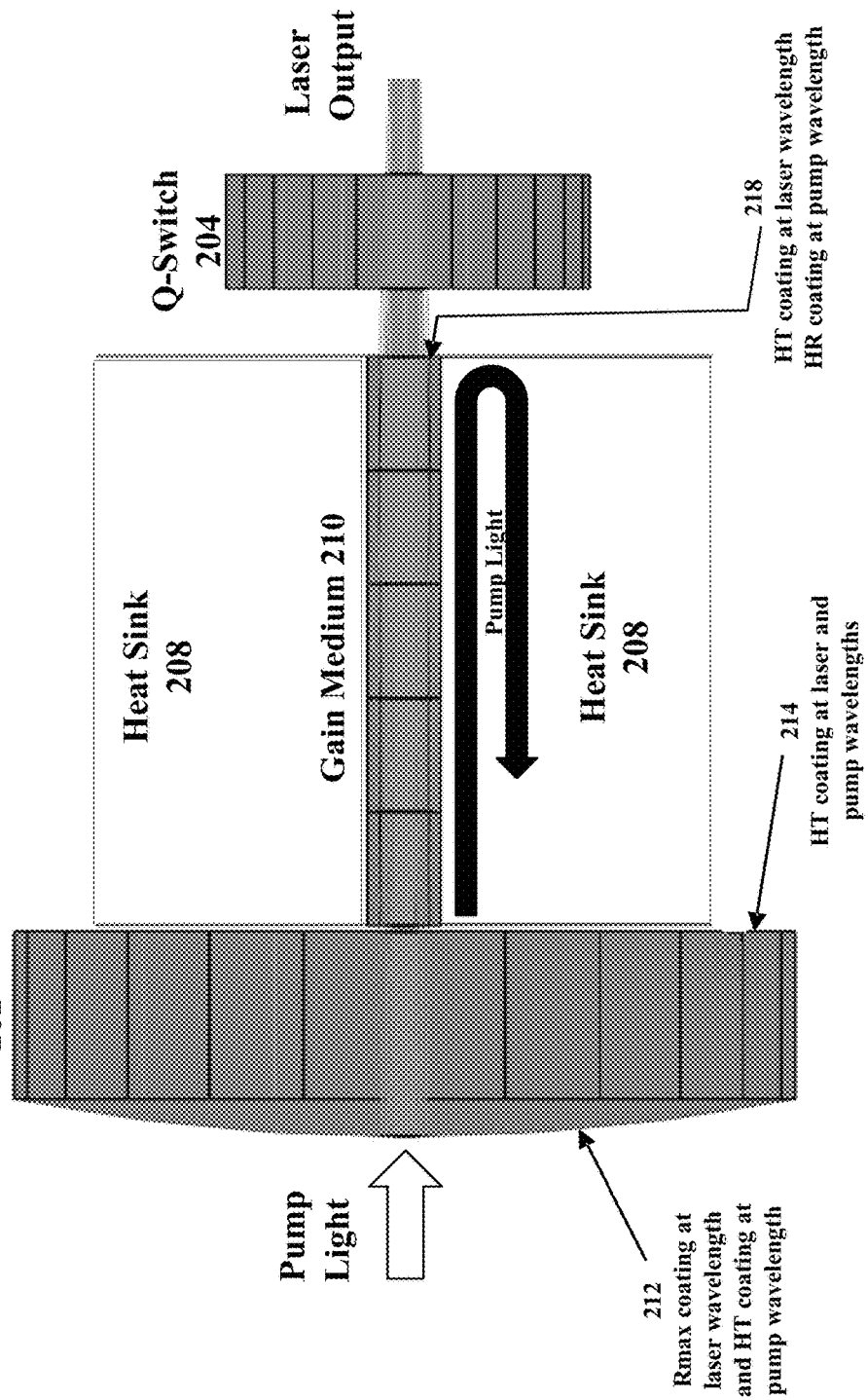
FIG. 2 shows a side view of an example laser head.

Laser head 112 shown in FIG. 1A may include back mirror 118. Back mirror 118 may be made of a suitable material (e.g., glass, plastic, and/or the like). Back mirror 118 may be curved and may have a degree of curvature that results in the laser beam being focused by an appropriate amount inside laser head 112. The degree of curvature may be tested to ensure that back mirror 118 works with the laser system to produce an output laser beam having desired characteristics. Back mirror 118 may be used to focus or otherwise converge the laser beam inside laser head 112. Back mirror 118 may be, for example, a lens, such as positive lens 202 as shown in FIG. 2. Referring again to FIG. 1A, back mirror 118 may have an input surface that may be a surface that receives the pump laser beam. Back mirror 118 may have a body. Back mirror 118 may have an output surface that may be a surface that transmits the pump laser beam. Back mirror 118 may reflect light received from output mirror/Q-switch 122 via gain medium 120 into gain medium 120. Back mirror 118 may be omitted from laser head 112.

Laser head 112 shown in FIG. 1A may include gain medium 120. Gain medium 120 may be made of a suitable material. For example, gain medium 120 may be made of glass doped with erbium and ytterbium. For example, gain medium 120 may be doped with erbium at a level of at a level of 0.2 wt % to 5 wt %. Gain medium 120 may be doped with ytterbium at a level of 2 wt % to 50 wt %. In an example, gain medium 120 may be comprised of a sintered ceramic crystal material appropriately doped. Gain medium 120 may receive the focused pump laser beam from back mirror 118 and may generate an output laser beam having one or more desired characteristics (e.g., wavelength, phase, intensity, and/or the like). Gain medium 120 may be attached to the output surface of back mirror 118. Gain medium 120 may have the shape of, for example, a rectangular prism or a cylindrical rod. Gain medium 120 may be a rectangular cuboid with a width and height of approximately 0.6 mm and a length of approximately 5 mm. Having a relatively narrow gain medium may result in increased efficiency and waste heat dissipation. Additionally, a relatively small gain medium size may help the laser system meet size, weight and/or cost requirements for LIDAR applications. In an example, if gain medium 120 is cylindrically shaped, the length may be 6 mm and the diameter may be less than 1 mm diameter.

Figure 3:
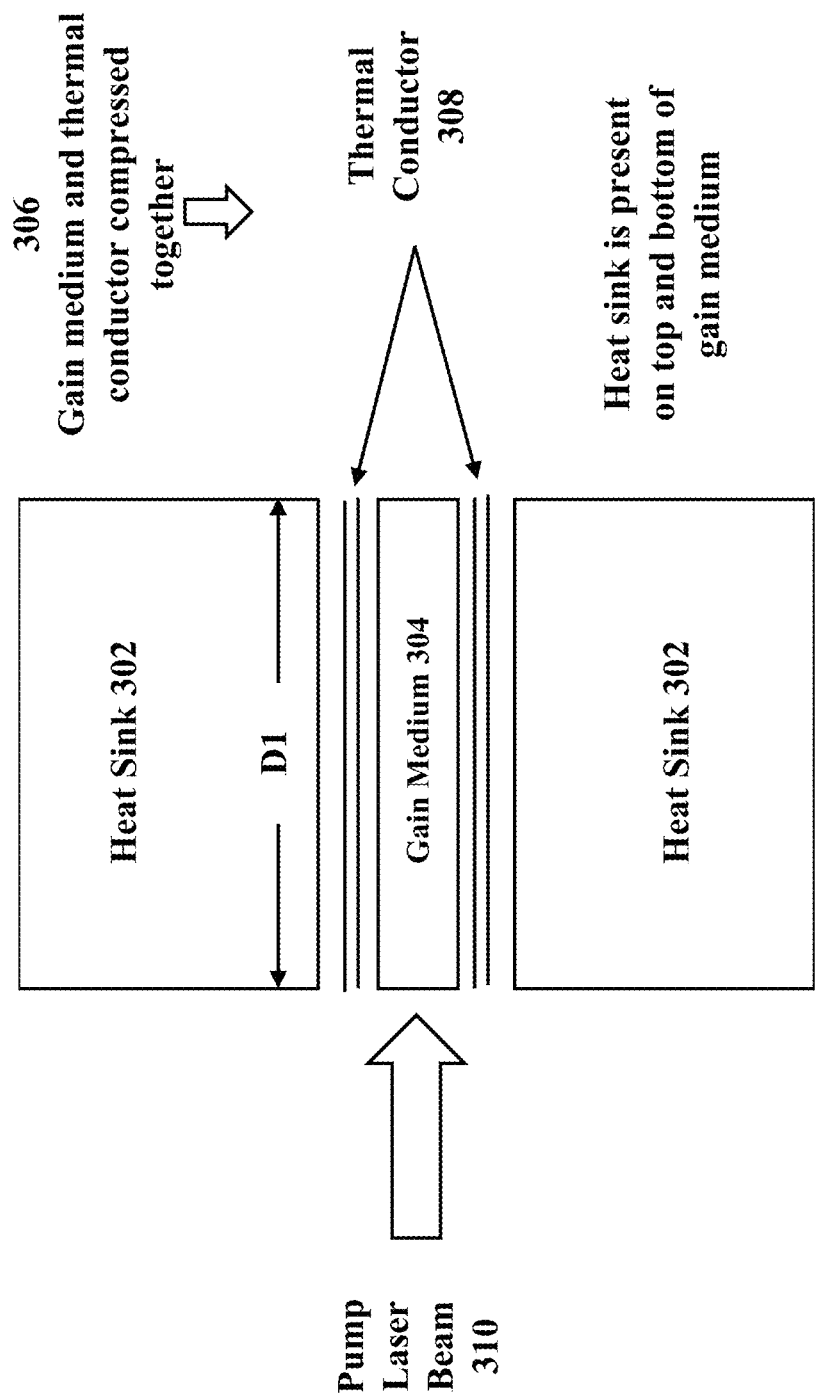
FIG. 3 shows an example of a gain medium surrounded by a heat sink.

Gain medium 120 may discharge excess heat to the environment at 124. A gain medium, such as gain medium 120, may be surrounded by a heat sink (e.g. as shown in FIG. 3) such that the two-opposite input/output surfaces are exposed while remaining surfaces of the gain medium contact the heat sink. One exposed face (e.g., an input surface) may or may not be attached to back mirror 118 and may receive the pump laser beam from back mirror 118. Another exposed face (e.g., an output surface) may or may not be attached to output mirror/Q-switch 122 and may emit the output laser beam. If gain medium 120 is cylindrically shaped, the heat sink may be designed to circularly encompass the rounded sides of the cylindrical gain medium (e.g., while leaving the input/output face exposed). The input surface of gain medium 120 may be coated with a reflective coating, for example, if back mirror 118 is omitted from the laser head.

One or more surfaces of gain medium 120 may be polished. In another example, the surfaces may be rough, which may result in increased heat transfer from gain medium 120 to the heat sink. For example, gain medium 120 may be saw cut such that the sides are relatively rough/unpolished, which may result in a larger relative surface area contacting the heat sink in order to increase heat dissipation. Gain medium 120 may be of a size or shape that may result in even heating of gain medium 120.

Laser head 112 shown in FIG. 1A may include output mirror/Q-switch 122. Output mirror/Q-switch 122 may be made of a suitable material, such as glass with a reflective coating, plastic with a reflective coating, glass doped with appropriate materials, spinel doped with cobalt, and/or the like. Output mirror/Q-switch 122 may receive the output laser beam from the output surface of gain medium 120. Output mirror/Q-switch 122 may reflect some or most of the output laser beam into gain medium 120, which may result in increased intensity of the output laser beam. Output mirror/Q-switch 122 may be a passive Q-switch. The passive Q-switch may have increased transmission for higher intensities of light, which may result in the passive Q-switch transmitting the output laser beam once the output laser beam has reached a given intensity. Using a passive Q-switch may result in increased peak power for the output laser beam when transmitted by the Q-switch.

Output mirror/Q-switch 122 and back mirror 118 may together form an optical resonator, which may be an optical cavity, into which gain medium 118 may be placed. A distance between back mirror 118 and output mirror/Q-switch 122 may be approximately 8 mm. Output mirror/Q-switch 122 may be affixed directly to the heat sink surrounding gain medium 120.

FIG. 2 shows a side view of an example laser head. Laser head 206 shown in FIG. 2 may be the same as laser head 112 shown in FIG. 1A. Laser head 206 shown in FIG. 2 may include positive lens 202 (e.g., which may correspond to back mirror 118 in FIG. 1A), heat sink 208, gain medium 210, and/or Q-switch 204. Positive lens 202 may be back mirror 118. Gain medium 210 may be gain medium 120. Q-switch 204 may be output mirror/Q-switch 122.

Laser head 206 shown in FIG. 2 may include a pumping mechanism, such as a pump laser, which may be pump laser 106 shown in FIG. 1A. The pumping mechanism may be physically separated from laser head 206. Physically separating the pumping mechanism from laser head 206 may result in, for example, improved dissipation of heat generated by laser head 206 and/or the pumping mechanism.

Laser head 206 shown in FIG. 2 may include positive lens 202. Positive lens 202 may be back mirror 118 shown with respect to FIG. 1A. Positive lens 202 may be made of a suitable material. For example, positive lens 202 may be made of glass or plastic. Positive lens 202 may have at least two surfaces, which may include an input surface and an output surface. One or both of the input surface and the output surface may be convex. For example, positive lens 202 may be a biconvex lens. Alternatively, one of the input surface or the output surface may be planar. For example, the input surface may be convex, the output surface may be planar, and positive lens 202 may be a plano-convex lens. If both the input surface and the output surface are convex, the input surface and the output surface may have different degrees of curvature. One or more surfaces of positive lens 202 may have a maximum reflectance (Rmax) coating at the wavelength of the pump laser beam and/or the output laser beam and/or a high throughput (HT) coating at the wavelength of the pump laser beam and/or the output laser beam. For example, the input surface of positive lens 202 may have a Rmax coating at the wavelength of the output laser beam and a HT coating at the wavelength of the pump laser beam at 212. The output surface of positive lens 202 may have a high throughput (HT) coating at the wavelength of the pump laser beam and the output laser beam at 214. Positive lens 202 may be aligned with respect to the gain medium, such as gain medium 210, using lateral movement. Positive lens 202 may be omitted from laser head 206 shown in FIG. 2.

The input surface of positive lens 202 may be used to receive a pump laser beam from the pumping mechanism. The pump laser beam may be altered (e.g., collimated, homogenized, redirected, etc.) by one or more mirrors or other optical elements (e.g., a mirror, prism, or rod lens) between the pumping mechanism and positive lens 202. For example, the pump laser beam may be homogenized using a fiber optic cable as disclosed herein. The pump laser beam may be collimated and/or focused by one or more lenses prior to entering positive lens 202. The pump laser beam may be shaped and/or altered by one or more rod lenses as shown in FIG. 1B (e.g. rod lens 130 and rod lens 132) and described herein. For example, there may be one rod lens in the vertical axis and one rod lens in the horizontal axis. One or more ball lenses, microscope objectives, and/or rod lenses may be used.

Positive lens 206 may focus the pump laser beam and may otherwise alter the pump laser beam. Positive lens 206 may transmit the focused pump laser beam via the output surface. Positive lens 206 may reduce pump beam divergence. Positive lens 206 may act as a focusing mirror substrate to prevent beam collimation. Positive lens 206 may converge the pump laser beam prior to the pump laser beam entering the gain medium, such as gain medium 210. By using positive lens 206, pump laser spatial artifacts may be improved prior to the pump laser reaching gain medium 210.

Laser head 206 shown in FIG. 2 may include gain medium 210. Gain medium 210 may be gain medium 120 shown with respect to FIGS. 1A and 1B. Gain medium 210 may be made of a suitable material. For example, gain medium 210 may be made of glass doped with erbium (e.g., at a level of 0.2 wt % to 5 wt %) and ytterbium (e.g., at a level of 2 wt % to 50 wt %), or a sintered ceramic crystal material appropriately doped. Gain medium 210 may have an input surface, an output surface, and at least one external surface. The input and output surfaces of gain medium 210 may be opposite each other (e.g., laser head 210 may be end pumped). The heat sink, such as heat sink 208, may be attached to the output surface of positive lens 206, for example using glue. A surface of heat sink 208 that may be planar with the input surface of gain medium 210 may be attached to positive lens 202. Positive lens 202 may be aligned with the optical cavity (e.g., heat sink 208, gain medium 210 and/or Q-switch 204) by positioning positive lens 202 in a transverse direction until the optical cavity is aligned (e.g. correctly aligned). Positive lens 202 may be attached (e.g., glued) to heat sink 208 once positive lens 202 is correctly aligned. Once positive lens 202 is attached to heat sink 208, positive lens 202 may not move relative to the optical cavity and may not change its alignment.

Gain medium 210 may receive the focused pump laser beam from the output surface of positive lens 202 via the input surface of gain medium 210 and may generate an output laser beam via the output surface of gain medium 210. A size of the output beam may be determined by, for example, a degree of curvature of positive lens 202, a size of gain medium 210, and/or a distance between positive lens 202 and Q-switch 204. Gain medium 210 may generate heat (e.g., waste or excess heat). One or more surfaces of gain medium 210 (e.g., the output surface) may have a high reflectance (HR) coating at the wavelength of the pump laser beam and/or an HT coating at the wavelength of the output laser beam, such as at 218. For example, the output surface of gain medium 210 may reflect the pump laser beam and may transmit the output laser beam. One or more surfaces of gain medium 210 (e.g., the input surface) may have a Rmax coating.

Gain medium 210 may have a suitable shape. For example, gain medium 210 may have the shape of a cylindrical rod. If gain medium 210 has the shape of a cylindrical rod, the input surface and output surface of gain medium 210 may be two bases (e.g., top and bottom) of the cylindrical rod, and the external surface may be a curved outer surface (e.g., a side) of the cylindrical rod.

Gain medium 210 may have the shape of a rectangular prism (e.g., a cuboid). If gain medium 210 has the shape of a rectangular prism, the input and output surface of gain medium 210 may be two opposing faces of the rectangular prism, and the external surface may be the remaining faces (e.g., quadrilateral faces). The rectangular prism may be formed such that opposing faces have the same dimensions (e.g., the rectangular prism may be a cuboid). A given face of the rectangular prism may have the two-dimensional shape of a rectangle (e.g., a square). The input and output surfaces of gain medium 210 may have a size that is similar to the width of the pump laser beam. For example, gain medium 210 may have a width and height of approximately 0.6 mm, and a length of 5 mm (e.g., if gain medium 210 is a rectangular prism) or a diameter of approximately 0.6 mm (e.g., if gain medium 210 is a cylindrical rod).

For example, gain medium 210 may have the shape of a rectangular prism with dimensions of 0.6×6×5 mm. Gain medium 210 may absorb approximately 62% or more of the pump laser beam power in a single pass. Using a larger gain medium may allow the pump laser beam to be bigger along the horizontal axis (e.g., the 6 mm dimension) without clipping. The pump laser beam may be collimated in an axis (e.g., the vertical axis or the 0.6 mm dimension), for example using a rod lens. The pump laser beam may be focused in an axis (e.g., the horizontal axis), for example using a rod lens, which may compensate for Beer's law of absorption and keeping the pump intensity constant. For example, one or more rod lenses may be used to collimate the pump laser beam in the vertical axis and/or to focus the pump laser beam in the horizontal axis. The rod lenses may collimate, focus, and/or diverge the pump laser beam in given axes as described herein. With a collimated pump laser beam, double passing through a 5 mm path length may result in 100% power at the input surface of the gain medium, such as gain medium 210, and 62% power at the output surface of the gain medium. If one axis of the pump laser beam is focused inside gain medium 210, the intensity of the pump laser beam may be more constant along the length of gain medium 210. For example, at approximately 2.7 mm from the input surface, the pump laser beam may have an intensity that is approximately 13% lower than at the input and output surfaces. Focusing the pump laser beam within gain medium 210, as compared to collimating the pump laser beam, may result in a higher average intensity of the pump laser beam throughout gain medium 210 and a higher minimum intensity within gain medium 210. The intensity at the input and output surfaces may be equal.

Laser head 206 shown in FIG. 2 may include heat sink 208. Heat sink 208 may be made of a suitable material. For example, heat sink 208 may be made of an alloy of copper and tungsten. For example, the alloy may include approximately 80% tungsten by weight and approximately 20% copper by weight. Heat sink 208 may have a coefficient of expansion that is approximately equal to a coefficient of expansion of the gain medium. For example, if gain medium 210 is erbium glass, the coefficient of expansion of the heat seat may be approximately 8.5 um/m/C. Heat sink 208 may be coupled to gain medium 210 and may receive heat generated by gain medium 210 (e.g., waste or excess heat) and may discharge the heat to the environment. Using heat sink 208 may result in a decreased operating temperature and a longer lifetime for gain medium 210. If heat sink 208 is not effective enough in dissipating heat and/or does not expand/contract together with gain medium 210, then gain medium 210 may shatter or break during operation. Thus, heat sink 208 may be configured to dissipate as much heat from gain medium 210 (which itself is an insulator) as may be achieved. Having at least one transverse dimension of gain medium 210 be relatively narrow (e.g., 0.6 mm) may also result in increased heat dissipation.

Heat sink 208 may be coupled to gain medium 210 such that two faces of gain medium 210 may be exposed (e.g., may not be coupled to the heat sink). For example, heat sink 208 may be coupled to the external surface(s) of gain medium 210 and may leave the input and output surfaces of gain medium 210 exposed. Coupling heat sink 208 to the external surface(s) of gain medium 210 may result in increased heat transfer between gain medium 210 and heat sink 208, and may result in even heat transfer between gain medium 210 and heat sink 208 (e.g., such that gain medium 210 heats evenly). A surface of heat sink 208 that is planar with the input surface of gain medium 210 may be attached to the heat sink which is also attached to positive lens 202.

There may be a material (not shown) disposed between gain medium 210 and heat sink 208. The material may be a thermal conductor. Using the material may result in increased heat transfer between gain medium 210 and heat sink 208 and may result in even heat transfer between gain medium 210 and the heat sink 208 (e.g., such that gain medium 210 heats evenly). The material may be, for example, a gasket (e.g., an indium gasket) or a coating on gain medium 210 (e.g., a metal or a non-metal coating). For example, gain medium 210 may be soldered to the heat sink. Using a soldered connection between gain medium 210 and heat sink 208 may allow the laser system to be manufactured more easily. As another example, a thermal conductor may be disposed between gain medium 210 and heat sink 208. Heat sink 208, the thermal conductor, and gain medium 210 may be compressed together using, for example, springs, screws, compliant gasket materials, and/or the like.

Laser head 206 shown in FIG. 2 may include Q-switch 204. Q-switch may be output mirror/Q-switch 122 shown with respect to FIG. 1A. Q-switch 204 may be made of a suitable material. For example, Q-switch 204 may be made of glass doped with appropriate materials or spinel doped with cobalt. In some examples, Q-switch 204 may be offset from the end of gain medium 210, for example by approximately 0.5 mm or less. For example, Q-switch 204 may be positioned in place using a lens mount. Using a lens mount may ensure that Q-switch 204 is angularly aligned (e.g. correctly angularly aligned). Q-switch 204 may be positioned using precision tolerance during the fabrication process of the individual components, including heat sink 208.

In an example, Q-switch 204 may be positioned directly at the output face of gain medium 210. For example, Q-switch 204 may be attached to the edge of heat sink 208 such that Q-switch 204 is directly adjacent to the output surface of gain medium 210. Q-switch 204 may be attached to heat sink 208 using glue (e.g., around the edges of Q-switch 204). Q-switch 204 may be attached to heat sink 208 in a way that ensures the output laser beam does not pass through any glue. By attaching Q-switch 204 directly to the heat sink, the overall design may be more rugged and may be easier to manufacturer, which may allow laser head 206 to meet some of the LIDAR performance requirements.

Q-switch 204 may be a passive Q-switch. For example, Q-switch 204 may be a saturable absorber. Q-switch 204 may receive the output laser beam from gain medium 210. Q-switch 204 may transmit and/or absorb a first portion of the output laser beam and reflect a second portion of the pump laser beam into gain medium 210. Reflecting a portion of the output laser beam into gain medium 210 may result in increased laser beam power within gain medium 210 and even heating of gain medium 210.

The proportion of the output laser beam in the first portion and the second portion may change. For example, Q-switch 204 may initially absorb a relatively higher proportion of the output laser beam. Gain medium 210 may reach an increased level of excitation by absorbing energy from the pump laser beam. Once the level of excitation of gain medium 210 has reached a given threshold, the portion of the output-laser beam reflected by Q-switch 204 may increase. Increasing the portion of the output laser beam reflected by Q-switch 204 may result in feedback and may allow gain medium 210 to generate the output laser beam. Q-switch 204 may transmit the output laser beam. Using Q-switch 204 may result in the output laser beam being pulsed, which may result in an increased peak power of the output laser beam.

FIG. 3 shows an example of a gain medium surrounded by a heat sink. For example, gain medium 304 may be surrounded by heat sink 302. The gain medium and the heat sink shown in FIG. 3 may be similar to or the same as the gain medium and heat sink shown in FIG. 2. For example, gain medium 304 may be gain medium 210, and heat sink 302 may be heat sink 208. As shown in FIG. 3, gain medium 304 may receive a pump laser beam at 310 from a pump laser (not shown). The pump laser beam may have a wavelength of approximately 940 nm. There may be a mirror (not shown) or other optical element between the pump laser and gain medium 304 that may serve to focus or otherwise converge the pump laser beam.

Gain medium 304 may be made of a suitable material. For example, gain medium 304 may be made of glass doped with erbium (e.g., at a level of 0.2 wt % to 5 wt %) and ytterbium (e.g., at a level of 2 wt % to 50 wt %), or may be a sintered ceramic crystal material appropriately doped. Gain medium 304 may have an input surface, an output surface, and at least one external surface. The input and output surfaces of gain medium 304 may be opposite each other (e.g., gain medium 304 may be end pumped). Gain medium 304 may receive the pump laser beam via the input surface of gain medium 304 and may generate an output laser beam via the output surface of gain medium 304. One or more surfaces of the gain medium 304 (e.g., the output surface) may have a high reflectance (HR) coating at the wavelength of the pump laser beam and/or an HT coating at the wavelength of the output laser beam. For example, the output surface of gain medium 304 may reflect the pump laser beam and transmit the output laser beam. Gain medium 304 may generate heat (e.g., waste or excess heat).

Gain medium 304 may have a suitable shape. For example, gain medium 304 may have the shape of a cylindrical rod. Gain medium 304 has the shape of a cylindrical rod, the input surface and output surface of gain medium 304 may be two bases (e.g., top and bottom) of the cylindrical rod, and the external surface may be a curved outer surface (e.g., a side) of the cylindrical rod.

Gain medium 304 may have the shape of a rectangular prism (e.g., a cuboid). If gain medium 304 has the shape of a rectangular prism, the input and output surface of gain medium 304 may be two opposing faces of the rectangular prism, and the external surface may be all remaining faces (e.g., quadrilateral faces). The rectangular prism may be formed such that opposing faces have the same dimensions (e.g., the rectangular prism may be a cuboid). A given face of the rectangular prism may have the two-dimensional shape of a rectangle (e.g., a square). The input and output surfaces of gain medium 304 may have a size that is similar to the width of the pump laser beam. For example, gain medium 304 may have a width and height of approximately 0.6 mm, and a length of 5 mm (e.g., if gain medium 304 is a rectangular prism) or a diameter of approximately 0.6 mm (e.g., if gain medium 304 is a cylindrical rod).

Heat sink 302 shown in FIG. 3 may be made of a suitable material. For example, heat sink 302 may be made of an alloy of copper and tungsten, or aluminum. For example, the heat sink 302 may include one or more copper/tungsten plates. Heat sink 302 may have a coefficient of expansion that is approximately equal to a coefficient of expansion of gain medium 304. Heat sink 302 may be coupled to gain medium 304 and may receive heat generated by gain medium 304 (e.g., waste or excess heat) and may discharge the heat to the environment. Using a heat sink 302 may result in a decreased operating temperature and a longer lifetime for gain medium 304. The heat sink 302 may have a length D1. The length D1 of the heat sink 302 may be, for example, approximately 5 mm.

Heat sink 302 may be coupled to gain medium 304 such that two faces of gain medium 304 are exposed (e.g., not coupled to the heat sink 302). For example, the heat sink 302 may be coupled to the external surface(s) of gain medium 304 and may leave the input and output surfaces of gain medium 304 exposed. Coupling the heat sink 302 to the external surface(s) of gain medium 304 may result in increased heat transfer between gain medium 304 and the heat sink 302, and may result in even heat transfer between gain medium 304 and the heat sink 302 (e.g., such that gain medium 304 heats evenly). Heat sink 302 may include two or more portions that are separable from each other. For example, heat sink 302 may include two copper/tungsten plates that may be joined to each other to surround gain medium 304.

There may be a thermal conductor (e.g., a metal foil), such as thermal conductor 308, disposed between gain medium 304 and the heat sink 302. Thermal conductor 308 may be, for example, indium foil, thermal paste, a thermal glue/gel, and/or the like. Using thermal conductor 308 may result in increased heat transfer between gain medium 304 and the heat sink 302 and may result in even heat transfer between gain medium 304 and the heat sink 302 (e.g., such that gain medium 304 heats evenly). Thermal conductor 308 may be, for example, a gasket (e.g., an indium gasket). Thermal conductor 308 and gain medium 304 may be compressed together, as shown at 306, using, for example, springs, screws (e.g., with proper tolerance machining), compliant gasket materials, and/or the like).

Figure 4A:
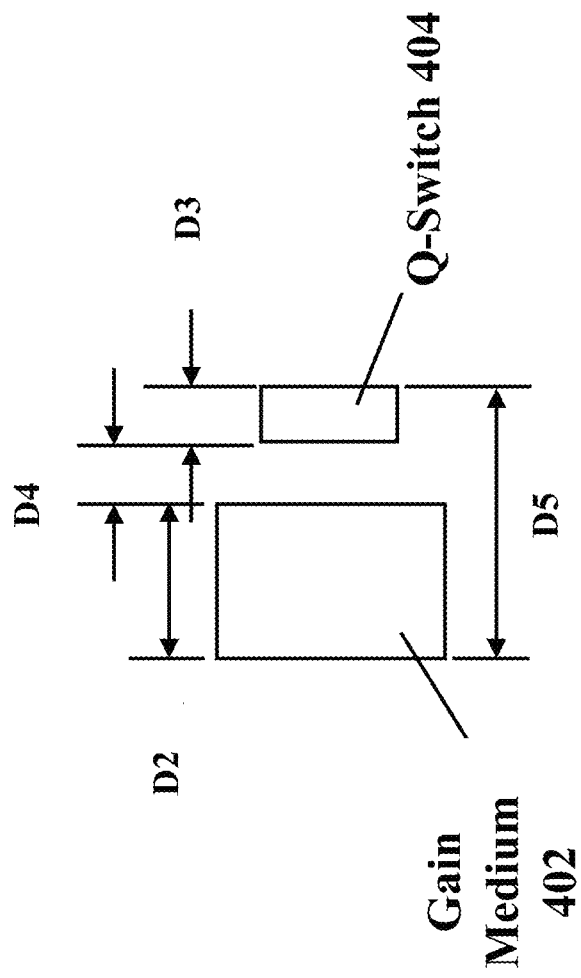
FIG. 4A shows example dimensions of a gain medium and Q-switch, where the gain medium and the Q-switch may be within an optical cavity.

FIG. 4A shows example dimensions of a gain medium and Q-switch, where the gain medium and the Q-switch may be within an optical cavity. For example, FIG. 4A shows example dimensions of gain medium 402 and Q-switch 404 that may be within optical cavity 408. Gain medium 402 and Q-switch 404 shown in FIG. 4A may be similar to or the same as gain medium 210 and Q-switch 204 shown in FIG. 2. Gain medium 402 and Q-switch 404 may form part of a laser head and/or a laser system (e.g., as shown in FIG. 2). Gain medium 402 may be made of a suitable material. For example, gain medium 402 may be made of glass doped with erbium (e.g., at a level of 0.2 wt % to 5 wt %) and ytterbium (e.g., at a level of 2 wt % to 50 wt %), or may be a sintered ceramic crystal material appropriately doped.

Gain medium 402 may have the shape of a rectangular prism (e.g., a cuboid). The rectangular prism may be formed such that opposing faces have the same dimensions (e.g., the rectangular prism may be a cuboid). A given face of the rectangular prism may have the two-dimensional shape of a rectangle (e.g., a square). There may be a heat sink (not shown) coupled to one or more faces of gain medium 402. For example, two opposite surfaces of gain medium 402 (e.g., an input surface and an output surface) may be exposed while remaining surfaces of gain medium 402 contact the heat sink.

The gain medium may have a length D2. For example, the length D2 of the gain medium may be approximately 5 mm. The heat sink (not shown) may have a length that is approximately the same as D2.

Q-switch 404 may be made of a suitable material. For example, Q-switch 404 may be made of glass doped with appropriate materials or spinel doped with cobalt. Q-switch 404 may be a passive Q-switch. For example, Q-switch 404 may be a saturable absorber. Q-switch 404 may reflect at least a first portion of light received from gain medium 402 and may transmit at least a second portion of light received from gain medium 402. A ratio of the first portion to the second portion may change, for example based on a total intensity of the light received from gain medium 402 over time.

Q-switch 404 may have a thickness D3. For example, the thickness D3 of the Q-switch 404 may be approximately 1 mm. There may be a gap between gain medium 402 and Q-switch 404. The gap between gain medium 402 and Q-switch 404 may have a length D4. The length D4 of the gap may be approximately 0.1 to 2.5 mm. The length D4 of the gap may be modified if, for example, there are constraints on the size of the laser system. Modifying the length D4 of the gap may result in an increase or decrease in performance of the laser system.

Figure 4B:
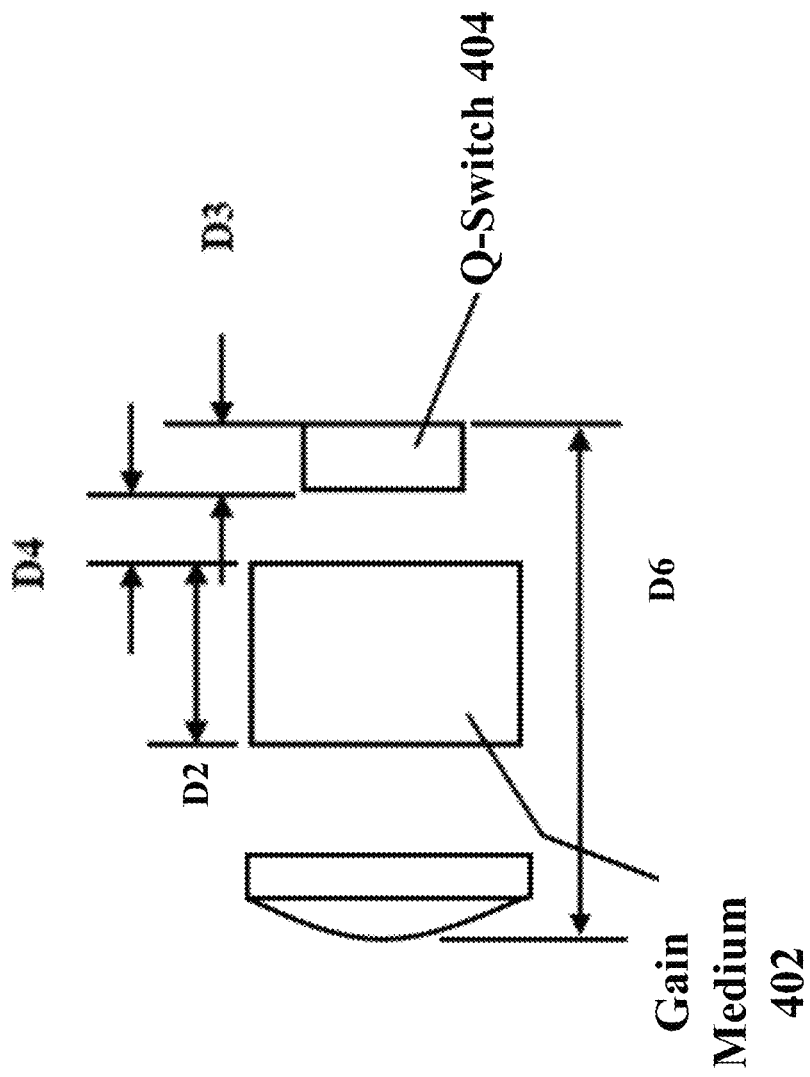
FIG. 4B shows example dimensions of a lens, gain medium, and Q-switch, where the lens, gain medium, and Q-switch may be within an optical cavity.

The back mirror and the Q-switch together may form optical cavity 408. Optical cavity 408 shown in FIG. 4A may be a relatively short optical cavity. Optical cavity 408 may include a lens (e.g., lens 406 as shown in FIG. 4B) or other optical element. Optical cavity 408 may have a length D5. For example, the length D5 of the optical cavity may be approximately 7.5 mm.

Modifying the length D5 of optical cavity 408 may result in a change in output power of the laser system. For example, increasing the length D5 of optical cavity 408 may result in a decreased output power of an output laser beam generated by gain medium 402 and transmitted via Q-switch 404. Conversely, decreasing the length D5 of optical cavity 408 may result in an increased output power of the output laser beam. For example, the output power may be approximately 0.22 W at a cavity length of 7.5 mm and approximately 0.14 W at a cavity length of 13 mm (e.g., assuming gain medium 402 is pumped with a 5.5 A pump laser).

Modifying the length D5 of optical cavity 408 may result in a modified beam profile of the output laser beam. For example, increasing the length D5 of optical cavity 408 may result in a better beam profile. Conversely, decreasing the length D5 of optical cavity 408 may result in a worse beam profile. The length D5 of optical cavity 408 may be selected based on a desired output power, beam profile, or combination thereof for the laser system.

FIG. 4B shows example dimensions of a lens, gain medium, and Q-switch, where the lens, gain medium, and Q-switch may be within an optical cavity. For example, FIG. 4B may show example dimensions of lens 406, gain medium 402, and Q-switch 404, which may be within optical cavity 410. Gain medium 402 and Q-switch 404 shown in FIG. 4B may be the same or similar to the gain medium and Q-switch shown in FIG. 4A. The distances D2, D3, and D4 shown in FIG. 4B may be approximately the same as the distances D2, D3, and D4 shown in FIG. 4A. Optical cavity 410 shown in FIG. 4B may include lens 406. For example, lens 406 may be a positive lens as described herein. For example, lens 406 may be positive lens 202 shown in FIG. 2. Optical cavity 410 shown in FIG. 4B may have a length D6. In an example, for the dimensions set for in FIG. 4A, the length D6 may be at least 7.6 m (e.g., 7.6 mm or slightly larger). For example, the length D6 may be approximately 9.6 mm.

Modifying the length D6 of optical cavity 410 may result in a change in output power of the laser system. For example, increasing the length D6 of optical cavity 410 may result in a decreased output power of an output laser beam generated by gain medium 402 and transmitted via Q-switch 404. Conversely, decreasing the length D6 of optical cavity 410 may result in an increased output power of the output laser beam. For example, the output power may be approximately 0.22 W at a cavity length of 7.5 mm and approximately 0.14 W at a cavity length of 13 mm (e.g., assuming gain medium 402 is pumped with a 5.5 A pump laser).

Modifying the length D6 of optical cavity 410 may result in a modified beam profile of the output laser beam. For example, increasing the length D6 of optical cavity 410 may result in a better beam profile. Conversely, decreasing the length D6 of optical cavity 410 may result in a worse beam profile. The length D6 of optical cavity 410 may be selected based on a desired output power, beam profile, or combination thereof for the laser system.

Figure 5:
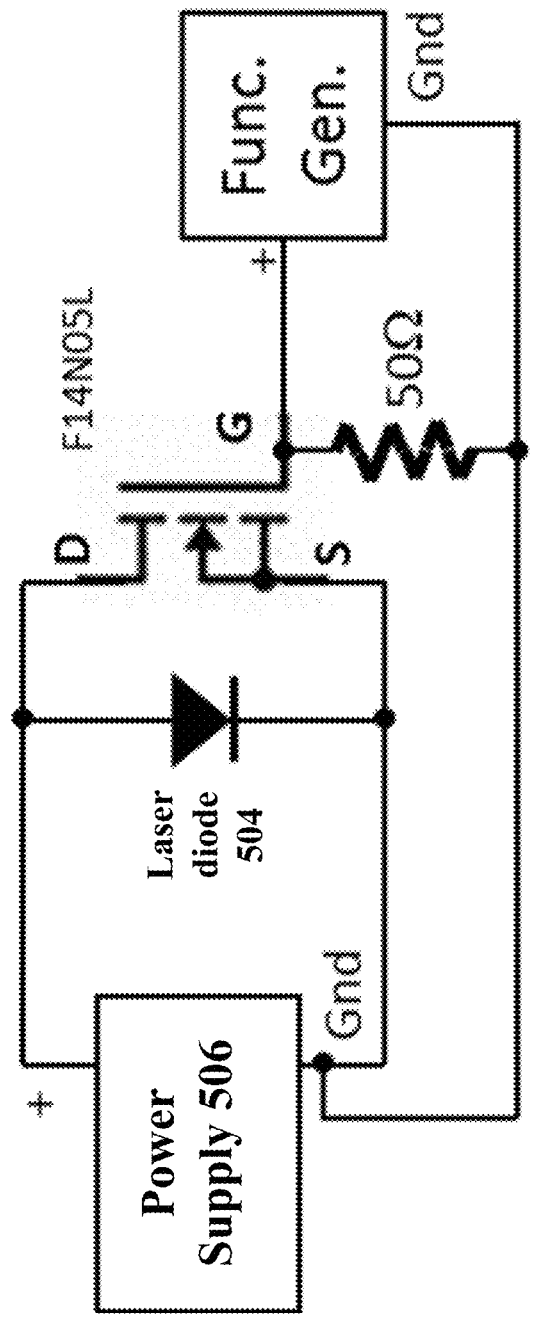
FIG. 5 shows an example circuit diagram for a pump laser.

FIG. 5 shows an example circuit diagram for a pump laser, such as pump laser 502. Pump laser 502 may be pump laser 106 shown in FIG. 1A. Referring again to FIG. 5, Pump laser 502 may be, for example, a laser diode, such as laser diode 504. Pump laser 502 may be powered by a power supply, such as power supply 506. Power supply 506 may be power supply 102 as shown in FIG. 1A. Referring again to FIG. 5, power supply 506 may be, for example, a DC laser driver. Power supply 506 may provide a current to the pump laser, for example at 5.5 A. Power supply may be connected to a transistor such as a field effect transistor (FET) (e.g., a MOSFET). The FET may be located relatively close to laser diode 504, of pump laser 502. The current may be shunted to ground via the FET. Using the FET may result in the laser having a pulse repetition rate with less frequency jitter. The FET may be connected to a function generator. The function generator may be used to generate different waveforms.

The circuit shown in FIG. 5 may be used to periodically chop the pump laser current so that the laser pulse repetition rate has relatively less frequency jitter. For example, the pump current may be shunted to ground using a FET physically located very near the laser diode 504 of the pump laser 502. Shunting the pump current (e.g. diode current) to ground effectively allows a DC laser driver to convert to a pulsed laser driver.

Figure 6:
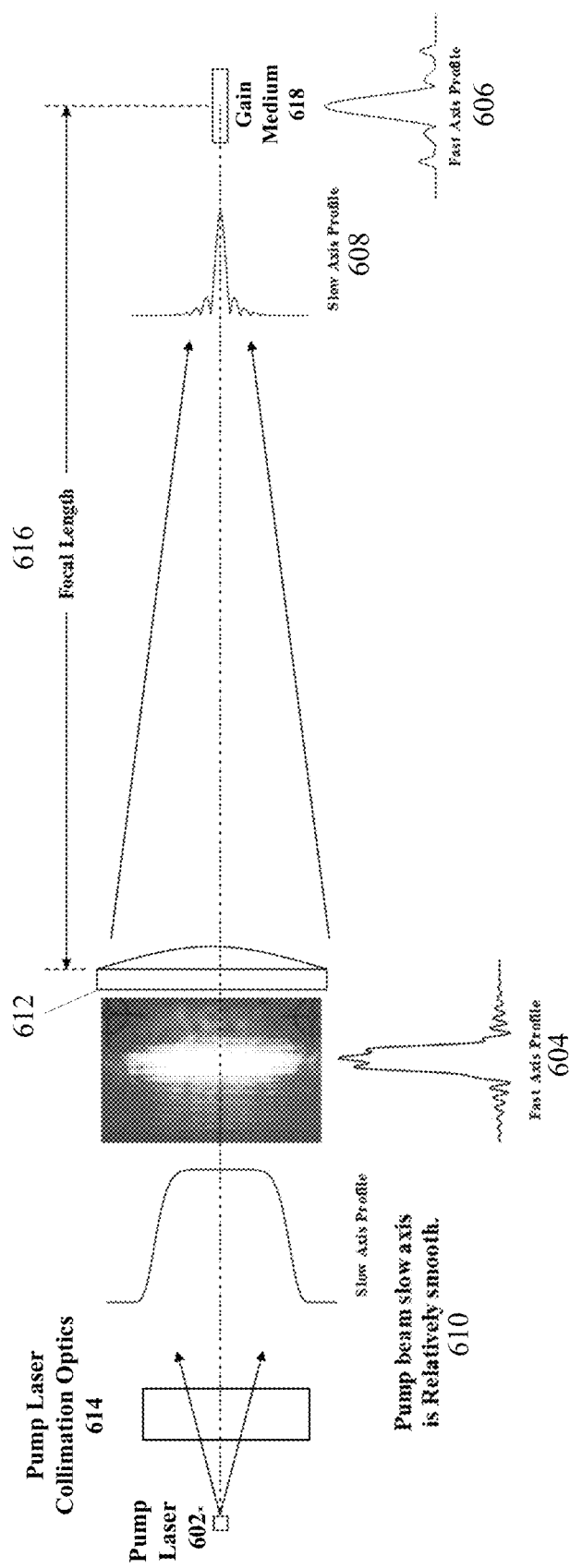
FIG. 6 shows an example of filtering a pump laser beam.

FIG. 6 shows an example of filtering a pump laser beam. As shown in FIG. 6, pump laser 602 may be used to generate a pump laser beam (e.g., a pump beam). Pump laser 602 may be a laser diode (e.g., a diode bar). The pump laser beam may be generated at a wavelength of 940 nm. Pump laser 602 may be oriented such that the pump laser beam has a fast axis and a slow axis. For example, the fast axis may be horizontal, and the slow axis may be vertical, or the fast axis may be vertical, and the slow axis may be horizontal. A fast axis may refer to a direction in which the pump laser beam comes from a relatively narrow region, and a slow axis may refer to a direction in which the pump laser beam comes from a relatively wide region. For example, the pump laser beam may have relatively high beam quality in the fast axis and relatively low beam quality in the slow axis.

As shown in FIG. 6 at 610, the slow axis of the pump laser beam may be relatively smooth. The intensity of the pump laser beam may be relatively equal at multiple points along the beam in the slow axis. The multiple points may be points on either side of a center of the pump laser beam in the slow axis. At points closer to the center of the pump laser beam than an edge of the pump laser beam in the slow axis, the intensity of the pump laser beam may change relatively less over distance. At points closer to an edge of the pump laser beam than the center of the pump laser beam in the slow axis, the pump laser beam may change relatively more over distance. For example, the intensity of the pump laser beam may be lower at points closer to an edge of the pump laser beam in the slow axis.

The fast axis of the pump laser beam may have relatively high spatial frequency components. For example, a profile of the pump laser beam in the fast axis may have a relatively large number of ripples, such as shown at 604. The pump laser beam may have relatively different intensities at multiple points along the beam in the fast axis. The intensity of the pump laser beam may decrease (e.g., rapidly) as distance from the center of the pump laser beam in the fast axis increases.

The pump laser beam may be focused using a lens or other optical element. For example, the pump laser may be collimated by an optical element (e.g., the pump laser collimation optics shown in FIG. 6 at 614). The pump laser may be focused by a lens, for example after being collimated at 612. For example, the lens may have one or more convex surfaces. The lens may focus the pump laser beam such that the focused pump laser beam has a relatively high beam quality in the fast axis, such as shown at 606, and in the slow axis at or near the center of the beam, such as shown at 608.

In the fast axis, the lens may separate the relatively high spatial frequency components from the low spatial frequency components of the pump laser beam. For example, a profile of the focused pump laser beam in the fast axis may be relatively smooth and may have one or more ripples moved towards edges of the focused pump laser beam. The intensity of the focused pump laser beam may be highest at a center of the focused laser beam for the slow axis and/or the fast axis.

The lens may have a focal length, such as focal length 616. There may be a gain medium, such as gain medium 618, located such that a center of the gain medium is at a focal point of the lens. For example, a distance between a center of the lens and the center of the gain medium may be equal to the focal length of the lens. Gain medium 618 may be made of a suitable material and may operate as described herein. The focused pump laser beam may be used to pump gain medium 618. The center of the focused pump laser beam may perform most of the pumping, for example because the intensity of the focused pump laser beam is highest at the center of the focused pump laser beam.

As disclosed herein, a laser system may be provided. The laser system may comprise one or more of a power supply, a pump laser, a gain medium, a heat sink, and a Q-switch. The pump laser may be a continuous-wave pump laser that may be configured to receive power from the power supply and may be configured to generate a first laser beam. The gain medium may comprise an input surface, an output surface, and at least one external surface. The input surface of the gain medium may be configured to receive the first laser beam from the pump laser. The input surface of the gain medium may comprise a reflective coating. The gain medium may be configured to generate a second laser beam and to emit the second laser beam via the output surface. The heat sink may be coupled to the at least one external surface of the gain medium. The Q-switch may be configured to receive the second laser beam from the gain medium.

The gain medium may comprise a glass doped with erbium and ytterbium. The glass of the gain medium may be doped with erbium at a level of 0.2 wt % to 5 wt %. The glass of the gain medium may be doped with ytterbium at a level of 2 wt % to 50 wt %. The gain medium may comprise a sintered ceramic crystal material.

The gain medium may have the shape of a cylindrical rod wherein the external surface of the gain medium may comprise a curved outer surface of the cylindrical rod. The gain medium may have the shape of a rectangular prism. The external surface of the gain medium that is the shape of a rectangular prism may comprise four quadrilateral faces of the rectangular prism. A heat sink may be coupled to the four quadrilateral faces of the gain medium.

The heat sink and the gain medium may have similar coefficients of expansion. For example, the heat sink and the gain medium may have substantially equal coefficients of expansion. The heat sink may comprise a copper-tungsten alloy, an aluminum, and/or the like.

The laser system may further comprise thermal conductor. The thermal conductor may be disposed between the heat sink and the gain medium. The thermal conductor may be a metal foil, such as indium foil; a thermal paste; a thermal gel; a thermal glue; and/or the like. The thermal conductor may assist heat to move from the gain medium and into the heat sink.

The Q-switch may be placed after the gain medium. The Q-switch may be coupled to an output surface of the gain medium and may be configured to receive the second laser beam from the gain medium. The Q-switch may be a self-standing optic. The Q-switch may be a passive Q-switch. The Q-switch may comprise glass doped with cobalt or spinel doped with cobalt. The Q-switch may be configured to reflect and/or transmit a portion of a laser beam. For example, the Q-switch may be configured to reflect a first laser beam and a first portion of a second laser beam. And the Q-switch may be configured to transmit a second portion of the second laser beam. The ratio between the first portion of the second laser beam and the second portion of the second laser beam may be dependent on a degree of absorption of the Q-switch.

The laser system may further comprise an optical component to homogenize the laser beam. The optical component may be, for example, a fiber optic cable. The fiber optic cable may be disposed between the pump laser and the gain medium. The fiber optic cable may be configured to homogenize the laser beam, such as the first laser beam.

The laser system may further comprise one or more rod lenses. The rod lens may be disposed between the pump laser and the gain medium. The rod lenses may be configured to alter a laser beam such that the laser beam diverges by an amount in a first axis and by another amount in another axis. For example, the rod lens may be configured to alter the first laser beam such that the first laser beam diverges by a first amount in a first axis and by a second amount in a second axis. The first axis and the second axis may be orthogonal. The first amount and the second amount may be different. A cross sectional area of the first laser beam may decrease as the first laser beam penetrates further into the gain medium.

The laser system may further comprise a lens. The lens may be disposed between the pump laser and the gain medium. The lens may have equal optical powers in orthogonal axis. The lens may have different optical powers in orthogonal axis.

The laser system may further comprise a positive lens. The positive lens may be disposed between the pump laser and the gain medium. The positive lens may be configured to focus a laser beam, such as the first laser beam. The positive lens may be attached to the heat sink.

The laser system may further comprise a laser head. The laser head may comprise the pump laser, the gain medium, the heat sink, and/or the Q-switch. The laser head or components of the laser head may be coupled to the heat sink. For example, one or more of the pump laser, the gain medium, and the Q-switch may be attached to the heat sink.

As disclosed herein, a laser head may be provided. The laser head may comprise a gain medium, a heat sink, and a Q-switch. The gain medium may comprise an input surface, an output surface, and at least one external surface. The input surface may be configured to receive a first laser beam from a pump laser. The gain medium may be configured to generate a second laser beam and to emit the second laser beam via the output surface. The heat sink may be coupled to the at least one external surface of the gain medium. The Q-switch may be coupled to the output surface and may be configured to receive the second laser beam from the gain medium.

The gain medium of the laser head may comprise a glass doped with erbium and ytterbium. The glass may be doped with erbium at a level of 0.2 wt % to 5 wt %. The glass may be doped with ytterbium at a level of 2 wt % to 50 wt %.

The laser head may further comprise a positive lens. The positive lens may be disposed between the pump laser and the gain medium. The positive lens may be configured to focus the first laser beam.

The gain medium of the laser head may have the shape of a rectangular prism. The external surface of the gain medium may comprise four quadrilateral faces of the rectangular prism. The heat sink may be coupled to the four quadrilateral faces of the gain medium.

The laser head may further comprise a fiber optic cable. The fiber optic cable may be disposed between the pump laser and the gain medium. The fiber optic cable may be configured to homogenize the first laser beam.

As disclosed herein, a positive lens for use in a laser apparatus may be provided. The positive lens may comprise a convex input surface and an output surface. The convex input surface may be configured to receive a laser beam from a pump laser. The convex input surface may be configured to focus the laser beam. The output surface may be configured to transmit the focused laser beam to a gain medium. The output surface may be convex. The output surface may be planar. The output surface may comprise a reflective optical coating. The output surface may be configured to transmit light received from the input surface and to reflect light received from the gain medium. Although the concepts and structures disclosed herein have been described with reference to several examples and exemplary embodiments, numerous modifications and variations may be made and still be within the scope described herein. No limitation with respect to any specific example or embodiment is intended to be necessary or mandatory, and the scope of the protection should be plainly apparent based on the language of the following claims.

What is claimed is:

1. A laser system comprising:
   a power supply;
   a pump laser configured to receive power from the power supply and configured to act as a pulsed source to generate a first laser beam at a first frequency;

a gain medium comprising an input surface, an output surface, a first external surface, and a second external surface, wherein the input surface is configured to receive the first laser beam, and wherein the gain medium is configured to generate a second laser beam and to emit the second laser beam via the output surface;

a fiber optic cable disposed between the pump laser and the gain medium, wherein the fiber optic cable homogenizes the first laser beam received from the pump laser;

a positive lens disposed between the fiber optic cable and the gain medium, wherein the positive lens comprises an output lens surface, wherein the positive lens is configured to focus the homogenized first laser beam received from the fiber optic cable, is configured to transmit the focused homogenized first laser beam to the gain medium, is configured to shape the second laser beam in accordance with a cavity, and is configured to reflect the shaped second laser beam to the gain medium;

a Q-switch coupled to the output surface and configured to receive the second laser beam from the gain medium;

a first heat sink coupled to the first external surface of the gain medium, the output lens surface, and the Q-switch; and a second heat sink coupled to the second external surface of the gain medium, the output lens surface, and the Q-switch.

2. The laser system of claim 1, wherein the positive lens comprises at least one of equal optical powers in an orthogonal axis, or a different optical power in an orthogonal axis.

3. The laser system of claim 1, wherein the gain medium is a rectangular prism that comprises four quadrilateral faces, wherein the first external surface comprises a first face from the four quadrilateral faces, and wherein the second external surface comprises a second face from the four quadrilateral faces.

4. The laser system of claim 1, wherein the first heat sink and the gain medium have a substantially equal coefficient of expansion.

5. The laser system of claim 1, further comprising a thermal conductor disposed between the first heat sink and the gain medium.

6. The laser system of claim 1, wherein the Q-switch is configured to reflect the first laser beam and a first portion of the second laser beam, and wherein the Q-switch is configured to transmit a second portion of the second laser beam.

7. The laser system of claim 1, wherein the first laser beam has a constant size in a first dimension and converges in a second dimension, and wherein the first dimension and the second dimension are orthogonal to each other.

8. A laser head, the laser head comprising:

a gain medium comprising an input surface, an output surface, a first external surface, and a second external surface, wherein the input surface is configured to receive a first laser beam, and wherein the gain medium is configured to generate a second laser beam and to emit the second laser beam via the output surface;

a fiber optic cable, wherein the fiber optic cable homogenizes the first laser beam;

a positive lens, wherein the positive lens comprises an output lens surface, wherein the positive lens is configured to focus the homogenized first laser beam, is configured to transmit the focused homogenized first laser beam to the gain medium, is configured to shape the second laser beam in accordance with a cavity, and is configured to reflect the shaped second laser beam to the gain medium;

a Q-switch coupled to the output surface and configured to receive the second laser beam from the gain medium;

a first heat sink coupled to the first external surface of the gain medium, the output lens surface, and the Q-switch;

a second heat sink coupled to the second external surface of the gain medium, the output lens surface, and the Q-switch.

9. The laser head of claim 8, wherein the gain medium comprises a glass doped with erbium and ytterbium.

10. The laser head of claim 8, wherein the gain medium comprises a glass doped with erbium at a level of 0.2 wt % to 5 wt %.

11. The laser head of claim 9, wherein the glass is doped with ytterbium at a level of 2 wt % to 50 wt %.

* * * * *